United States Patent Office 3,718,648
Patented Feb. 27, 1973

3,718,648
BASICALLY SUBSTITUTED 2,4-(1H,3H)-
QUINAZOLINDIONE DERIVATIVES
Rudi Beyerle, Bruchkobel, and Adolf Stachel, deceased, late of Frankfurt am Main-Fechenheim, by Inge Stachel, Frankfurt am Main-Fechenheim, and Sophie Stachel, Augsburg, Germany, heirs, assignors to Cassella Farbwerke Mainkur Aktiengesellschaft, Frankfurt am Main-Fechenheim, Germany
No Drawing. Filed June 25, 1970, Ser. No. 49,932
Claims priority, application Germany, July 4, 1969,
P 19 34 037.5
Int. Cl. C07d 87/50
U.S. Cl. 260—247.2 A           6 Claims

ABSTRACT OF THE DISCLOSURE

Pharmacologically valuable, basically substituted 2,4-(1H,3H)-quinazolindione derivatives having the formula

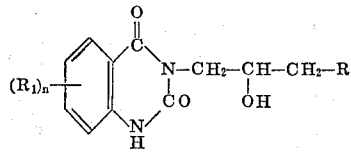

wherein R stands for the radical selected from the group consisting of di-$C_1$-$C_4$-alkylamine, N-methyl-benzylamine, N-methyl-N-cyclohexylamino, N-methyl-allylamino, N-methyl piperazino, N - methyl-N-(piperidino-n-propyl)-amino, N-methyl-N-(methoxy-n-propyl)-amino, hexamethylene-imino, morpholino, thio-morpholino, pyrrolidino and piperidino, said radical being bound via a nitrogen atom; $R_1$ stands for alkoxy groups having 1 to 4 carbon atoms, which are preferably in the 6,7 or 6,7,8-position; and $n$ stands for the integers 2 or 3.

The present invention relates to new, pharmacologically, valuable basically substituted 2,4-(1H,3H)-quinazolindione derivatives having the formula

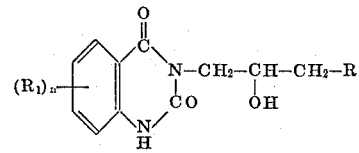

wherein R means the radical of a secondary aliphatic, cycloaliphatic, araliphatic amine having 2 to 10 carbon atoms or of a 5, 6, or 7-membered heterocyclic nitrogen base, which contains in the nucleus besides the nitrogen atom a corresponding number of methylene groups as well as optionally a further nitrogen atom, an O or an S atom, said radical being bound via a nitrogen atom; $R_1$ stands for alkoxy groups having 1 to 4 carbon atoms which are preferably in the 6,7 or 6,7,8-position; and $n$ means the integers 2 or 3.

Furthermore, the present invention relates to processes for the production of said compounds.

The radical of a secondary amine R which is bound via a nitrogen atom may derive in the aliphatic series from mono and diamines, such as dialkylamines, alkylalkenylamines, alkylenediamines, hydroxyalkylamines and alkoxyalkylamines.

Such amines are for instance; dimethylamine, diethylamine, allylmethylamine, N,N-diethyl-N'-methylethylenediamine, N,N-diethyl-N'-methylpropylenediamine, N-methylethanolamine, N-methylpropanolamine, N-isopropylethanolamine, N-butylethanolamine, N-benzylethanolamine, N-methyl-methoxypropylamine, N-methylethoxypropylamine.

Cycloaliphatic amines may be for instance: N-methylcyclopropylamine, N-methylcyclohexylamine.

Amines of the araliphatic series may be for instance: phenylalkylalkylamines such as benzylmethylamine, phenethylmethylamine.

Heterocyclic nitrogen bases may be for instance: 5, 6 and 7-membered heterocyclic nitrogen bases such as pyrrolidine, morpholine, thiomorpholine, piperidine, N-methyl-piperazine, N-phenylpiperazine, N-($\beta$-hydroxyethyl)-piperazine, N-($\gamma$-hydroxypropyl)-piperazine, hexamethyleneimine, 2,5-dimethyl-piperazine.

The compounds produced in accordance with the present invention are useful as anticonvulsants and sedatives. They are also valuable intermediates for the preparation of compounds having coronary dilator properties. They may, for example, be converted by acylation, preferably in the presence of an acid-binding agent, into basically substituted 2,4-(1H,3H)-quinazolindione derivatives having the formula

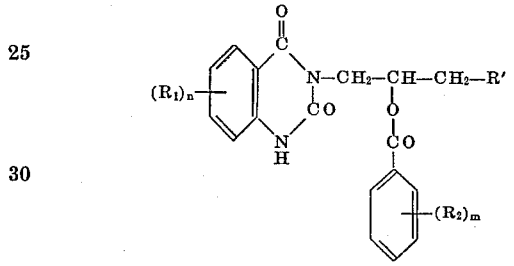

as more specifically disclosed in U.S. Ser. No. 49,923, filed June 25, 1970, by Rudi Beyerle, Adolf Stachel, Rolf-Eberhard Nitz, Klaus Resag and Eckhard Schraven for "New Basically Substituted 2,4-(1H,3H)-Quinazolindione Derivatives and Process for the Production Thereof."

The 2,4-(1H,3H)-quinazolindione derivatives of the present invention may be prepared in different methods.

They are, for instance, obtained in processes known per se by:

(a) Condensing a 2,4-(1H,3H)-quinazolindione derivative which is substituted in the 3-position by a $\gamma$-halogeno-$\beta$-hydroxypropyl radical and has the formula

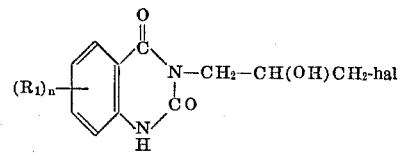

or the corresponding epoxy compound with a secondary amine of the formula R—H, or by (b) Reacting a 2,4-(1H,3H-quinazolindione of the formula

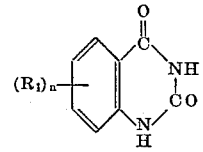

with a $\gamma$-halogeno-$\beta$-hydroxypropylamine of the formula hal—$CH_2$—CH(OH)—$CH_2$—R or by (c) Cyclizing an o-amino-benzamide derivative of the formula

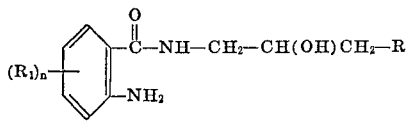

with a carbonic acid derivative, such as phosgene, ethyl chloroformiate or urea, or by (d) Condensing an o-alkoxycarbonyl-phenyl carbamoyl chloride of the formula

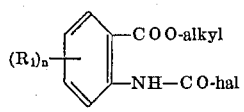

with a γ-amino-β-hydroxypropylamine of the formula $$H_2N-CH_2-CH(OH)-CH_2R$$

and converting by heating in a weakly alkaline medium the urea derivative formed primarily having the formula

into the corresponding 2,4-(1H,3H)-quinazolindione.

A further process hitherto unknown consists in:

(e) Reacting an o-alkoxycarbonyl-phenylisocyanate of the formula

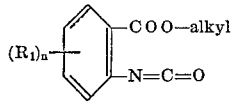

with a γ-amino-β-hydroxypropylamine of the formula $$H_2N-CH_2-CH(OH)-CH_2R$$

As compared with the process described under paras (a), (b), (c) and (d) which partially give only poor yields, the method described under para (e) offers great advantages. Thus, the rather easily accessible o-alkoxycarbonyl-phenylisocyanates react without adverse side reactions in a single reaction step so as to form the 3-γ-amino-β-hydroxypropyl - 2,4 - (1H,3H)-quinazolindiones in good yields. This has been surprising and unobvious inasmuch as the reactions of aromatic amines with o-alkoxycarbonyl-phenylisocyanates as were hitherto known in literature only led to open-chained urea derivatives (see British Pat. 1,055,786).

The compounds used as starting materials in the processes described hereinbefore are obtained as may be seen from the following examples in different methods known per se.

For a better understanding of the nature and the objects of this invention, reference should be made to the accompanying examples which are of an illustrative rather than a limiting nature, Unless otherwise stated, all temperatures given are in degrees centigrade.

EXAMPLE 1

(a) 6,7,8-trimethoxy-2,4-(1H,3H)-quinazolindione 22.6 g. (0.1 mol) 3,4,5-trimethoxy-anthranilamide and 11 g. sodium carbonate are suspended in 120 cc. chlorobenzene and subsequently admixed dropwise while stirring at 80–90° with 12 g. (0.11 mol) ethyl chloroformiate. Stirring is continued for 7 hours at 100°, the reaction mixture is sucked off, while hot, from the inorganic salts and the filtrate is concentrated in vacuo. For further purification the remaining crude product is stirred with ether, sucked off and dried. Obtained is the 6,7,8-trimethoxy-2,4-(1H,3H)-quinazolindione having a melting point of 259–260°. Yield: 18 g. (equals 71.5% of the theoretical).

(b) 3-(γ-chloro-β-hydroxypropyl)-6,7,8-trimethoxy-2,4-(1H,3H)-quinazolindione 25.2 g. (0.1 mol) 6,7,8-trimethoxy-2,4-(1H,3H)-quinazolindione are dissolved in 90 cc. anhydrous dimethylsulfoxide and after the addition of 11.2 g. (0.1 mol) potassium tert. butylate stirred for about 1 hour at room temperature. While stirring, this solution is then added dropwise at 30–35° to 90 g. epichlorhydrin. Stirring is continued for 4 hours at room temperature and then the reaction mixture is poured into water. The aqueous solution is shaken out several times with methylene chloride, then the insolute is sucked off and the thusly obtained methylene chloride extracts are washed with 5 N. hydrochloric acid. After concentrating the methylene chloride solution in vacuo one obtains the 3-(γ-chloro-β-hydroxypropyl) - 6,7,8-trimethoxy-2,4-(1H,3H)-quinazolindione in the form of colorless needles melting at 185°.

Yield: 11 g. (equals 31.8% of the theoretical).

(c) 3-(γ-diethylamino-β-hydroxypropyl)-6,7,8-trimethoxy-2,4-(1H,3H)-quinazolindione 34.5 g. (0.1 mol) 3-(γ-chloro-β-hydroxypropyl)-6,7,8-trimethoxy-2,4-(1H,3H)-quinazolindione, 11 g. sodium carbonate and 14.6 g. (0.2 mol) diethylamine are suspended in 350 cc. anhydrous chlorobenzene and then stirred during 12 hours at 120° in an autoclave. The reaction mixture is evaporated to dryness in vacuo and the residue is triturated with diluted hydrochloric acid. Subsequently, the insolute is filtered off and the filtrate is rendered alkaline by the addition of potassium carbonate. The reaction product which separates in the form of crystals is sucked off, washed with water and dried. For further purification the reaction product is recrystallized from dioxane. Obtained is the 3-(γ-diethylamino-β-hydroxypropyl)-6,7,8 - trimethoxy - 2,4-(1H,3H)-quinazolindione in the form of colorless crystals melting at 182°.

Yield: 21 g. (equals 55% of the theoretical).

The 3-(γ-chloro-β-hydroxypropyl) - 6,7,8 - trimethoxy-2,4-(1H,3H)-quinazolindione described under para 1(b) is also obtained by reacting in the following manner the 2,3,4-trimethoxy - 6 - methoxycarbonyl-phenylisocyanate with 3-chloro-1-amino-propanol (2)-hydrochloride:

26.7 g. (0.1 mol) 2,3,4-trimethoxy-6-methoxycarbonyl-phenylisocyanate, prepared as described in Example 5, para (a), are dissolved in 240 cc. dioxane and then admixed with a solution consisting of 16.1 g. (0.11 mol) 3-chloro-1-amino-propanol (2)-hydrochloride in 80 cc. water. Subsequently, a solution of 11 g. sodium carbonate in water is added dropwise while stirring. Stirring is continued for 12 hours at room temperature and the reaction product which separates in the form of crystals is sucked off and, for further purification, recrystallized from dioxane. Obtained is the 3-(γ-chloro-β-hydroxypropyl)-6,7,8-trimethoxy-2,4 - (1H,3H) - quinazolindione melting at 185°.

Yield: 32 g. (equals 92.6% of the theoretical).

EXAMPLE 2

3-(γ-morpholino-β-hydroxypropyl)-6,7,8-trimethoxy-2,4-(1H,3H)-quinazolindione 25.2 g. (0.1 mol) 6,7,8-trimethoxy-2,4-(1H,3H)-quinazolindione (see Example 1(a)) are dissolved in 90 cc. anhydrous dimethylsulfoxide and after the addition of 11.2 g. (0.1 mol) potassium tert. butylate stirred for about 1 hour at room temperature. Then a solution of 18 g. (0.1 mol) N-(γ-chloro-β-hydroxypropyl)-morpholine in 30 cc. anhydrous dimethylsulfoxide is added dropwise and stirring is continued overnight at 40°. Subsequently, the solvent is largely distilled off in vacuo and the residue is admixed with diluted hydrochloric acid. The insolute is then filtered off and the filtrate is rendered alkaline by the addition of aqueous potassium carbonate solution. The reaction product which separates in the form of crystals is sucked off, washed with water and dried. By recrystallization from dimethylformamide one obtains the 3-(γ-morpholino-β-hydroxypropyl)-6,7,8-trimethoxy-2,4-(1H,3H)-quinazolindione in the form of colorless needles melting at 218–220°.

EXAMPLE 3

(a) 2-nitro-3,4,5-trimethoxy-N-(γ-chloro-β-hydroxypropyl)-benzamide 146 g. (1 mol) 3-chloro-1-amino-propanol (2)-hydrochloride are dissolved in 1000 cc. anhydrous chloroform and 202 g. (2 mol) triethylamine are added. Then a solution of 275.5 g. (1 mol) 2-nitro-3,4,5-trimethoxybenzoylchloride in 500 cc. anhydrous chloroform is added dropwise while stirring at 10–20°. Subsequently, stirring is continued for several hours at 50°. The solvent is then distilled off at 50° in vacuo and the residue is dissolved in 2000 cc. ethyl acetate. The ethyl acetate solution is washed several times with water, dried over anhydrous sodium sulfate and the solvent is evaporated to dryness at 50° in the water-jet vacuum. As residue there remains a yellowish oil which crystallizes after having been allowed to stand for a while. By triturating it with ether one obtains the 2-nitro-3,4,5-trimethoxy-N-(γ-chloro-β-hydroxypropyl)-benzamide in the form of colorless crystals melting at 78–80°.

Yield: 300 g. (equals 86% of the theoretical).

(b) 2-nitro-3,4,5-trimethoxy-N-(γ-morpholino-β-hydroxypropyl)-benzamide 35 g. (0.1 mol) 2-nitro-3,4,5-trimethoxy-N-(γ-chloro-β-hydroxypropyl)-benzamide are dissolved in 200 cc. anhydrouschlorobenzene and after the addition of 10.6 g. (0.1 mol) anhydrous sodium carbonate admixed with 8.7 g. (0.1 mol) morpholine. The reaction mixture is then stirred for 10–12 hours under reflux, sucked off, while hot, from the inorganic salts and the filtrate is concentrated at 60° in vacuo. The residue is dissolved in dilute aqueous hydrochloric acid, extracted with ether and the aqueous phase is rendered alkaline by the addition of potassium carbonate. The aqueous phase is then extracted with ethyl acetate and the extract washed several times with water and then dried over anhydrous sodium sulfate. After concentrating at 40° in vacuo, one obtains the 2-nitro-3,4,5-trimethoxy - N - (γ-morpholino-β-hydroxypropyl)-benzamide in the form of a light yellow oil which is then further treated.

Yield: 35 g. (=90% of the theoretical).

(c) 2-amino-3,4,5-trimethoxy-N-(γ-morpholino-β-hydroxypropyl)-benzamide 40 g. (0.1 mol) 2-nitro-3,4,5-trimethoxy-N-(γ-morpholino-β-hydroxypropyl)-benzamide are dissolved in 250 cc. methanol and hydrogenated in the presence of Raney nickel as catalyst at 30–40° and at a hydrogen pressure of 50–60 atmospheres. After filtering off the catalyst, the filtrate is concentrated at 40° in the water-jet vacuum. The residue is dissolved in little anhydrous ethanol and admixed with alcoholic hydrochloric acid. After having been allowed to stand for a while, the dihydrochloride of the 2 - amino - 3,4,5-trimethoxy-N-(γ-morpholino-β-hydroxypropyl)-benzamide is sucked off, and washed with anhydrous ethanol and ether. By recrystallizing from anhydrous ethanol one obtains colorless crystals having a decomposition point of 237–240°.

Yield: 39 g. (=89% of the theoretical).

The 2 - amino - 3,4,5 - trimethoxy-N-(γ-morpholino-β-hydroxypropyl)-benzamide described under para(c) may also be obtained by reacting 2 - nitro - 3,4,5 - trimethoxybenzoyl chloride with N-(γ-amino-β-hydroxypropyl)-morpholine and subsequent catalytical hydrogenation:

15.8 g. (0.1 mol) γ-morpholino-β-hydroxypropyl-amine are dissolved in 100 cc. anhydrous benzene and 26.1 g. (0.1 mol) 2-nitro-3,4,5-trimethoxybenzoyl chloride are added in portions while stirring. Stirring is continued for 12 hours at room temperature and the reaction mixture is admixed with dilute hydrochloric acid. The hydrochloric acid solution is separated and shaken out with ethyl acetate for purification purposes. The aqueous phase is then separated and, while cooling, rendered alkaline with sodium carbonate solution. The oily separating reaction product is dissolved in ethyl acetate and the solution thusly obtained is evaporated to dryness. Without further purification, the oily residue is then hydrogenated in methanol in the presence of Raney nickel and the reaction product is isolated and purified as described in the above Example under para(b). Obtained are the colorless crystals of the dihydrochloride having a decomposition point of 237–240°.

The same intermediate may be prepared as follows from the 3,4,5-trimethoxy-isatoic anhydride of the formula

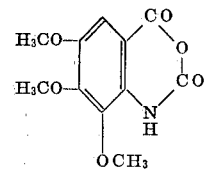

24.1 g. (0.1 mol) 3,4,5-trimethoxy-isatoic anhydride having a melting point of 251° and being prepared by introduction of phosgene into an aqueous solution of the hydrochloride of the 3,4,5 - trimethoxy-2-amino-benzoic acid, are suspended in 150 cc. dioxane and then admixed with 18.7 g. (0.11 mol) γ-morpholino-β-hydroxy-propylamine. The reaction mixture is stirred at room temperature until it represents a limpid solution (after approx. 2–3 hours). Then this solution is concentrated in vacuo and the oily precepitating reaction product is dissolved in ethyl acetate. For further purification purposes the ethyl acetate layer is first washed with an aqueous sodium carbonate solution and then with water. After drying over potassium carbonate and addition of etheric hydrochloric acid one obtains in the form of colorless crystals the dihydrochloride of the 2 - amino-3,4,5-trimethoxy-N-(γ-morpholino-β-hydroxypropyl)-benzamide melting at 235–240° (with decomposition).

Yield: 31 g. (=70% of the theoretical).

(d) 3-(γ-morpholino-β-hydroxypropyl)-6,7,8-trimethoxy-2,4-(1H,3H)-quinazolindione 44.2 g. (0.1 mol) 2 - amino - 3,4,5-trimethoxy-N-(γ-morpholino-β-hydroxypropyl)-benzamide dihydrochloride are dissolved in 150 cc. anhydrous dioxane and added dropwise, while stirring, at room temperature to a solution of 60 g. phosphene in 300 cc. anhydrous dioxane. Stirring is continued for another hour and the reaction product is then evaporated to dryness in vacuo. The residue is dissolved in water, filtered so as to become limpid and the filtrate is rendered alkaline by the addition of aqueous sodium bicarbonate solution. After sucking off, the separated crystalline precipitate is suspended in dilute sodium hydroxide solution. The suspension is then heated during 10 minutes to the boil whereby a limpid solution is formed. Subsequently, concentrated hydrochloric acid is added until the solution becomes acid and the reaction product is precipitated in the form of its base by the addition of aqueous sodium bicarbonate solution. After sucking off and drying, one obtains by recrystallization from dimethylformamide the 3 - (γ-morpholino-β-hydroxypropyl) - 6,7,8 - trimethoxy - 2,4 - (1H,3H)-quinazolindione in the form of colorless crystals melting at 218–220°.

Yield: 23 g. (=58.3% of the theoretical).

EXAMPLE 4

3-(γ-diethylamino-β-hydroxypropyl)-6,7,8-trimethoxy-2,4-(1H,3H)-quinazolindione 42.7 g. (0.1 mol) 2-amino-3,4,5-trimethoxy-N-(γ-diethylamino-β-hydroxypropyl)-benzamide dihydrochloride and 30.3 g. (0.22 mol) potassium carbonate are suspended in 400 cc. anhydrous methyl ethyl ketone and admixed, while stirring, at room temperature with 10.2 g. (0.11 mol) ethyl chloroformiate. Stirring is continued for another hour at room temperature and then the reaction mixture is heated during 6 hours to the boil. Subsequently, it is evaporated to dryness in vacuo and the residue is admixed with 300 cc. o-dichlorobenzene. Subsequently, while stirring, the reaction mixture is heated for 5 hours to the boil. After cooling down, it is sucked off and the residue is triturated with water. The crude product which is insoluble in water is dissolved for further purification in dilute hydrochloric acid and filtered off from the insolute. The filtrate is admixed with aqueous potassium carbonate solution and the precipitated reaction product is sucked off. After drying, it is recrystallized from dioxane. Obtained in the form of colorless crystals is the 3-(γ-diethylamino-β-hydroxypropyl) - 6,7,8 - trimethoxy - 2,4 - (1H,3H)-quinazolindione melting at 182°.

Yield: 15 g. (equal 39.4% of the theoretical).

The same product is obtained by melting in the known manner the 2-amino-3,4,5-trimethoxy-N-(γ-diethylamino-β-hydroxypropyl)-benzamide dihydrochloride together with urea.

EXAMPLE 5

(a) 2,3,4-trimethoxy-6-methoxycarbonyl-phenyl-isocyanate 24.1 g. (0.1 mol) methyl 3,4,5-trimethoxy-anthranilate are dissolved in 200 cc. anhydrous toluene and transformed with stirring at 80–90° into the hydrochloride by the introduction of gaseous hydrogen chloride. A strong stream of phosgene is then introduced, with stirring, at 90° into the suspension of the hydrochloride. After approx. 3 hours the reaction is terminated. By the introduction of anhydrous air the excessive phosgene which is still dissolved in the toluene is largely blown out. The insolute is then sucked off and the filtrate is evaporated to dryness in vacuo. For further purification the residue is dissolved with gentle heating in anhydrous ether, then filtered and the filtrate is again evaporated to dryness. Obtained in the form of colorless needles is the 2,3,4-trimethoxy-6-methoxycarbonyl-phenylisocyanate having a melting point of 76–78°.

Yield: 18 g. (equal 67.3% of the theoretical).

(b) 3-(γ-diethylamino-β-hydroxypropyl)-6,7,8-trimethoxy-2,4-(1H,3H)-quinazolindione 26.7 g. (0.1 mol) 2,3,4-trimethoxy-6-methoxycarbonyl-phenylisocyanate are dissolved in 130 cc. anhydrous toluene and admixed with stirring at room temperature with a solution consisting of 16 g. (0.11 mol) γ-diethylamino-β-hydroxypropylamine in 50 cc. methanol. Stirring is continued for 3 hours at room temperature and the crude product which has precipitated in the form of crystals is sucked off. For further purification the crude product which is first washed with little methanol is dissolved in dilute hydrochloric acid, filtered so as to become limpid and the filtrate is rendered alkaline by the addition of aqueous potassium carbonate solution. The precipitated reaction product is sucked off, washed with water and dried. After recrystallization from dioxane, one obtains the 3 - (γ-diethylamino-β-hydroxypropyl) - 6,7,8 - trimethoxy-2,4-(1H,3H)-quinazolindione in the form of colorless crystals melting at 182°.

Yield: 35 g. (equal 92% of the theoretical).

EXAMPLE 6

(a) 3,4-dimethoxy-6-methoxycarbonyl-phenyl-carbamoyl chloride 21.1 g. (0.1 mol) methyl 4,5-dimethoxy-anthranilate are dissolved, while heating, in 300 cc. anhydrous toluene. Then a stream of gaseous hydrogen chloride is introduced at 80° with stirring until the hydrochloride has completely precipitated. Subsequently, a strong stream of phosgene is introduced at the same temperature whereby the precipitated hydrochloride gradually goes into solution. After having introduced the phosgene for approx. 3 hours, little quantities of insoluble substances are sucked off from the reaction solution and the filtrate is evaporated to dryness in vacuo. For further purification purposes, the reaction product may be recrystallized from ethyl acetate. Obtained in the form of colorless needles in the 3,4-dimethoxy - 6 - methoxycarbonyl-phenyl-carbamoyl chloride which sinters at temperatures beyond 117° and decomposes at 130–135°.

Yield: 23 g. (equal 84% of the theoretical).

(b) N-3,4-dimethoxy-6-methoxycarbonylphenyl)-N'-(γ-diethylamino-β-hydroxypropyl)urea hydrochloride 23.7 g. (0.1 mol) 3,4-dimethoxy-6-methoxycarbonyl-phenylcarbamoyl chloride are dissolved in 180 cc. anhydrous dioxane and admixed with a solution of 16 g. (0.11 mol) γ-diethylamino-β-hydroxypropylamine in 30 cc. anhydrous dioxane. The reaction solution is stirred for 16 hours at 80° and the precipitate being formed is sucked off. Obtained is the hydrochloride of the N-(3,4-dimethoxy - 6 - methoxycarbonyl-phenyl) - N'-(γ-diethylamino-β-hydroxypropyl)-urea in the form of colorless crystals melting at 258–260°.

Yield: 27 g. (equal 64.5% of the theoretical).

(c) 3-(γ-diethylamino-β-hydroxypropyl)-6,7-dimethoxy-2,4-(1H,3H)-quinazolindione 41.9 g. (0.1 mol) N-(3,4-dimethoxy-6-methoxycarbonyl-phenyl) - N' - (γ-diethylamino-β-hydroxypropyl)-urea hydrochloride are dissolved in 200 cc. water. The reaction solution is rendered alkaline by the addition of aqueous sodium bicarbonate solution and then heated for approx. 10 minutes, with stirring, to the boil whereby the precipitate being formed after the addition of the sodium bicarbonate solution goes into solution and the reaction product precipitates. The crystalline reaction product is sucked off, washed with water and, after drying, recrystallized from ethyl acetate. Obtained is the 3-(γ-diethylamino-β-hydroxypropyl)-6,7-dimethoxy - 2,4 - (1H,3H)-quinazolindione melting at 186°.

Yield: 22 g. (=62.7% of the theoretical).

Analogously to the methods described in the above examples, the following 2,4-(1H,3H)-quinazolindiones of the present invention may be prepared.

General formula:

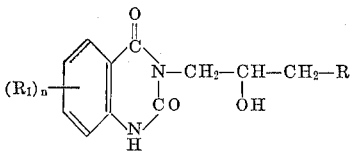

| $(R_1)_n$ | R | M.P. |
|---|---|---|
| 6,7,8—$(OCH_3)_3$ | —N(piperidino) | 213–215° |
| 6,7,8—$(OCH_3)_3$ | —N(hexamethyleneimino) | 212–214° |
| 6,7,8—$(OCH_3)_3$ | —N(morpholino) | 190–192° |
| 6,7,8—$(OCH_3)_3$ | —N⟨N—$CH_3$⟩ | 207–209° |
| 6,7,8—$(OCH_3)_3$ | —N⟨N—$CH_2$—$CH_2$—OH⟩ | [1] 190–192° |
| 6,7,8—$(OCH_3)_3$ | —N⟨S⟩ (thiomorpholino) | 225° |
| 6,7,8—$(OCH_3)_3$ | $CH_3$<br>\|<br>—N—$CH_2CH_2CH_2$—O—$CH_3$ | 142° |
| 6,7,8—$(OCH_3)_3$ | $CH_3$<br>\|<br>—N—$CH_2$—$C_6H_5$ | 155° |
| 6,7,8—$(OCH_3)_3$ | $CH_3$<br>\|<br>—N—$CH_2$—CH=$CH_2$ | 162° |
| 6,7,8—$(OCH_3)_3$ | $CH_3$<br>\|<br>—N—⟨cyclohexyl H⟩ | 154° |
| 6,7,8—$(OCH_3)_3$ | $CH_3$<br>\|<br>—N—$CH_2CH_2CH_2$—N(piperidino) | 140° |
| 6,7,8—$(OCH_3)_3$ | $C_4H_9$<br>\|<br>—N<br>\|<br>$C_4H_9$ | 212° |

[1] Dihydrochloride.

What is claimed is:

1. A basically substituted 2,4 - (1H,3H) - quinazolindione derivative having the formula

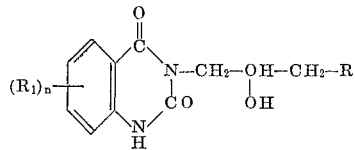

wherein R stands for a radical selected from the group consisting of di-$C_1$-$C_4$-alkylamino, N-methyl-benzylamino, N-methyl-N-cyclohexylamino, N-methyl-allylamino, N-methyl-piperazino, N-methyl - N - (piperidino-n-propyl)-amino, N-methyl - N - (methoxy-n-propyl)-amino, hexamethylene-imino, morpholino, thiomorpholino, pyrrolidino and piperidino; $R_1$ stands for alkoxy groups having 1–4 carbon atoms; and $n$ stands for an integer selected from the group consisting of 2 and 3.

2. 3 - [γ-diethylamino-β-hydroxypropyl] - 6,7,8 - trimethoxy-2,4-(1H,3H)-quinazolindione.

3. 3 - [γ-morpholino-β-hydroxypropyl] - 6,7,8 - trimethoxy-2,4-(1H,3H)-quinazolindione.

4. 3-[γ-piperidino - β - hydroxypropyl] - 6,7,8 - trimethoxy-2,4-(1H,3H)-quinazolindione.

5. 3 - [γ-hexamethyleneimino-β-hydroxypropyl]-6,7,8-trimethoxy-2,4-(1H,3H)-quinazolindione.

6. 3-[γ-pyrrolidino - β - hydroxypropyl]-6,7,8-trimethoxy-2,4-(1H,3H)-quinazolindione.

References Cited
UNITED STATES PATENTS 3,274,194  9/1966  Hayao _____ 260—256.4

DONALD G. DAUS, Primary Examiner
R. V. RUSH, Assistant Examiner

U.S. Cl. X.R.

260—243 B, 256.4 Q, 999